(12) United States Patent
Wang et al.

(10) Patent No.: US 11,476,667 B2
(45) Date of Patent: Oct. 18, 2022

(54) HYBRID ELECTROMAGNETIC TRANSIENT SIMULATION METHOD FOR MICROGRID REAL-TIME SIMULATION

(71) Applicant: Shanghai Jiao Tong University, Shanghai (CN)

(72) Inventors: Keyou Wang, Shanghai (CN); Jin Xu, Shanghai (CN); Guojie Li, Shanghai (CN); Zirun Li, Shanghai (CN); Pan Wu, Shanghai (CN)

(73) Assignee: Shanghai Jiao Tong University, Shanghai (CN)

( * ) Notice: Subject to any disclaimer, the term of this patent is extended or adjusted under 35 U.S.C. 154(b) by 127 days.

(21) Appl. No.: 17/024,593

(22) Filed: Sep. 17, 2020

(65) Prior Publication Data

US 2021/0050722 A1    Feb. 18, 2021

Related U.S. Application Data

(63) Continuation of application No. PCT/CN2019/106095, filed on Sep. 17, 2019.

(30) Foreign Application Priority Data

Aug. 16, 2019 (CN) .......................... 201910756536.9

(51) Int. Cl.
     *H02J 3/00*         (2006.01)
     *H02J 3/38*         (2006.01)

(52) U.S. Cl.
     CPC .............. *H02J 3/004* (2020.01); *H02J 3/381* (2013.01); *H02J 2203/20* (2020.01)

(58) Field of Classification Search
     CPC ........ H02J 3/004; H02J 3/381; H02J 2203/20; H02J 3/00125; Y02E 60/00; Y04S 40/20
     See application file for complete search history.

(56) References Cited

U.S. PATENT DOCUMENTS

2005/0273309 A1\* 12/2005 Yoneyama ............ G06F 30/367
                                            703/14
2008/0052651 A1\* 2/2008 Wang ...................... G06F 30/18
                                            703/19

(Continued)

FOREIGN PATENT DOCUMENTS

CN        106372339 A     2/2017
CN        106777636 A     5/2017

(Continued)

OTHER PUBLICATIONS

U.S. Appl. No. 17/086,259, Xu, Jin et al., filed Oct. 30, 2020.

(Continued)

*Primary Examiner* — Ziaul Karim
(74) *Attorney, Agent, or Firm* — Mei & Mark LLP; Manni Li

(57) ABSTRACT

A hybrid electromagnetic transient simulation method for microgrid real-time simulation, wherein a traditional node analysis method (NAM) and a highly parallel latency insertion method (LIM) are combined, so that the microgrid is firstly divided from a filter of a distributed power generation system to form one latency insertion method (LIM) network containing a power distribution line and a plurality of node analysis method (NAM) networks containing the distributed power generation system respectively, the NAM network being simulated by traditional node analysis method, the LIM network being simulated by the latency insertion method, in an initialization stage, one correlation matrix and four diagonal matrixes containing line parameters used for LIM network simulation being formed according to line topology and parameters of the microgrid, in a main cycle of the simulation, the LIM network solved simultaneously with multiple NAM networks, a parallelism of a microgrid simulation being improved.

2 Claims, 4 Drawing Sheets

(56) References Cited

U.S. PATENT DOCUMENTS

| | | | | |
|---|---|---|---|---|
| 2012/0078605 | A1* | 3/2012 | Rahmat | G06F 30/367 |
| | | | | 703/14 |
| 2016/0080221 | A1* | 3/2016 | Ramachandran | H04L 12/4633 |
| | | | | 709/224 |
| 2016/0373236 | A1* | 12/2016 | Ha | G01R 31/08 |
| 2018/0004867 | A1 | 1/2018 | McKinley et al. | |

FOREIGN PATENT DOCUMENTS

| | | |
|---|---|---|
| CN | 106777827 A | 5/2017 |
| CN | 106886617 A | 6/2017 |
| CN | 109614700 A | 4/2019 |

OTHER PUBLICATIONS

H. W. Dommel and W. S. Meyer, "Computation of electromagnetic transients," *Proceedings of the IEEE*, vol. 62, No. 7, pp. 983-993 (Jul. 1974).

\* cited by examiner

HYBRID ELECTROMAGNETIC TRANSIENT SIMULATION METHOD FOR MICROGRID REAL-TIME SIMULATION

CROSS-REFERENCE TO RELATED APPLICATIONS

The subject application is a continuation of PCT/CN2019/106095 filed on Sep. 17, 2019, which claims priority on Chinese Application No. CN201910756536.9 filed on Aug. 16, 2019 in China. The contents and subject matter of the PCT international application and Chinese priority application are incorporated herein by reference.

TECHNICAL FIELD

The present invention relates to power system, in particular, a hybrid electromagnetic transient simulation method suitable for microgrid real-time simulation.

BACKGROUND ART

A microgrid is used for energy management of new energy access in the power distribution network. Before the practical application of the microgrid, the hardware-in-loop test, which is based on electromagnetic transient simulation, is needed for its controller, protection device, and control strategy.

H. W. Dommel of Canada proposed the basic theory and method of electromagnetic transient simulation in the late 1960s. Electromagnetic transient simulation can be divided into off-line simulation and real-time simulation. In general, off-line simulation tools take far more computation time than the duration of the transient phenomena under study. When facing an application scene with strict requirements on time, the real-time simulation ensures the accurate synchronization of an internal clock of the simulator with a real world clock through the cooperation of software and hardware platforms, and can provide a highly simulated actual field test environment for various protection and control devices of a power system.

There are many AC/DC or DC/DC converters in the microgrid, and the high-frequency switching characteristics of power electronic switches bring great challenges to the realization of real-time simulation of the microgrid. In order to realize real-time simulation with small time-step, not only hardware platform is required to have strong computing power, but also high-efficiency simulation model and simulation algorithm are needed. At present, in electromagnetic transient real-time simulation, most simulation programs adopt the node analysis method (NAM) and switches adopt fixed admittance model for modeling. The calculation amount of the node voltage equation solved through the node analysis method is in quadratic proportion to the simulation scale. With the increase of the simulation scale, the hardware resources and execution time consumed by the Field Programmable Gate Array (FPGA) module will increase rapidly. However, the calculation amount of the latency insertion method (LIM) is linearly proportional to the simulation scale.

SUMMARY OF THE INVENTION

The present invention provides the hybrid electromagnetic transient simulation method that is suitable for the microgrid real-time simulation. The node analysis method (NAM) is used for simulation for the power electronic converter so that the accuracy of switch modeling can be ensured. The latency insertion method (LIM) is used for simulation for the distribution network to reduce the consumption of hardware resources. The LIM network and the NAM network can be solved simultaneously, thus, the parallelism and the efficiency of the microgrid simulation calculation are improved.

To improve the efficiency of the traditional electromagnetic transients program (EMTP) electromagnetic transient simulation algorithm, the present invention provides a hybrid electromagnetic transient simulation method that is suitable for microgrid real-time simulation. According to the method of the present invention, the microgrid system is divided into one latency insertion method (LIM) network and a plurality of node analysis method (NAM) networks, and the LIM network and the plurality of NAM networks can be solved simultaneously, so that the parallelism of simulation is greatly improved. In addition, the method of the present invention avoids the calculation burden occurred when only the node analysis method is used for solving large-scale network equations, and thus, the simulation efficiency is improved.

The hybrid electromagnetic transient simulation method for microgrid real-time simulation of the present invention comprises an initialization stage of steps (1) to (4) and a simulation cycle stage of steps (5) to (7) as follows:

(1) performing division of network by dividing a microgrid model from the LC or LCL filter at an outlet of a converter of a distributed power generation system, connecting in series the inductance L in the filter to an equivalent voltage source, wherein the inductance L is close to a power distribution line of the microgrid, and the equivalent voltage source comprises a grounded negative electrode, and forming a latency insertion method (LIM) network with the power distribution line of the microgrid; and connecting the remaining capacitance C of each filter to an equivalent current source in parallel, of which the positive direction is flowing into the ground, and forming a node analysis method network together with the corresponding distributed power generation system;

(2) performing modeling exchange by representing the power distribution line in the latency insertion method network by a PI equivalent model, wherein a branch between nodes is represented by inductance and resistance in series connection, and a branch from nodes at both ends to ground is represented by capacitance; representing the voltage source in the latency insertion method network by Norton equivalent form, wherein an equivalent conductance is in parallel connection with an equivalent current source; representing a load in the latency insertion method network by a constant impedance model, wherein resistance, inductance, capacitance, or a combination thereof are in parallel connection, if there are multiple branches between nodes, converting the multiple branches into one single branch and expressing in a form of inductance, resistance, a voltage source, or a combination thereof in series connection to form an latency insertion method common branch, if there are multiple branches from the node to ground, converting the multiple branches into one single branch and expressing in a form of capacitance, conductance, a current source, or a combination thereof in parallel connection to form an latency insertion method node branch, sequentially numbering the latency insertion method common branch and the latency insertion method node branch, respectively, starting with a number of a grounded node being 0;

(3) forming an incidence matrix M of the latency insertion method network according to following rules:

(i) if branch p is connected with node q, and a positive direction defined by common branch p is flowing out of node branch q, M(q,p)=1;

(ii) if common branch p is connected with node branch q and a positive current direction defined by common branch p is flowing into node branch q, M(q,p)=−1;

(iii) if common branch p and node branch q are not connected, M(q,p)=0;

(4) forming two node voltage coefficient matrixes $P_+$, $P_-$ and two branch current coefficient matrixes $Q_+$, $Q_-$ of the LIM network according to following rules:

$$P_+ = \left(\frac{C}{\Delta t}+G\right)^{-1}\left(\frac{C}{\Delta t}\right) \quad P_- = \left(\frac{C}{\Delta t}+G\right)^{-1}$$

$$Q_+ = \left(\frac{L}{\Delta t}\right)^{-1}\left(\frac{L}{\Delta t}-R\right) \quad Q_- = \left(\frac{L}{\Delta t}\right)^{-1}$$

C and G being diagonal matrixes of $N_n \times N_n$, and diagonal elements being ground capacitance and ground conductance of a latency insertion method node branch with a corresponding number; L and R being diagonal matrixes of $N_b \times N_b$, and diagonal elements being inductance and capacitance of a latency insertion method common branch with a corresponding number; $\Delta t$ being a simulated time-step; $N_n$ and $N_b$ being a number of latency insertion method node branch(es) and a number of latency insertion method common branch(es) respectively;

(5) updating a node voltage of the latency insertion method node branch according to following rule:

$$V_{nodal}^{n+1} = P_+ V_{nodal}^n - P_-(MI_{branch}^n - H_{nodal}^n)$$

$V_{nodal}^{n+1}$ being a node voltage vector of the latency insertion method node branch at time n+1, $I_{branch}^n$ being a branch current vector of the latency insertion method common branch at time n, and $H_{nodal}^n$ being an equivalent current source vector of the latency insertion method node branch at time n; carrying out simulation solution of the node analysis method network simultaneously;

Meanwhile, the NAM network simulation is carried out, and for the specific calculation process, reference can be made to electromagnetic transient simulation teaching materials based on node analysis method, which is not described in detail herein (see for example, H. W. Dommel and W. S. Meyer, "Computation of electromagnetic transients," Proceedings of the IEEE, vol. 62, no. 7, pp. 983-993, July 1974.);

(6) updating branch current of the LIM common branches according to following rule:

$$I_{branch}^{n+1} = Q_+ I_{branch}^n + Q_-(M^T V_{nodal}^{n+1} + E_{branch}^{n+1} + E_{equiv}^{n+1})$$

$M^T$ being a transpose of incidence matrix M, $E_{equiv}^{n+1}$ being an equivalent voltage source vector of the LIM common branches at time n+1, which is a non-zero element only at a position corresponding to the filter inductance branch and has a magnitude of a voltage magnitude corresponding to a filter capacitance in the NAM network, obtained current in the filter inductance branch in $I_{branch}$ serving as a corresponding parallel equivalent current source of a filter capacitance branch in next NAM network simulation solution; and (7) judging whether simulation is terminated or not, if not, returning to the step (5), entering a next simulation cycle, and terminating the simulation until a specified simulation time or when an instruction for terminating in advance is received.

Compared with the existing technology, the present invention has the technical effects in that:

(1) The traditional node analysis method (NAM) is combined with the highly parallel latency insertion method (LIM). The distribution network of the microgrid is simulated with the latency insertion method (LIM), which is called the LIM network, while the distributed power generation and converter systems is simulated with the node analysis method (NAM), which is called the NAM network. The LIM network and the plurality of NAM networks can be solved simultaneously, and the parallelism of the microgrid simulation is improved.

(2) when the method of the present invention is used for carrying out real-time simulation of the microgrid, the calculation speed is higher than that of the traditional node analysis method, and the simulation efficiency of the microgrid real-time simulation is greatly improved. In the traditional node analysis method, the inverse of the coefficient matrix in the node voltage equation is a high-order off-diagonal matrix, where the calculation amount is in quadratic proportion to the number of nodes. In the method of the present invention, all coefficient matrixes of the LIM network are diagonal matrixes, and all coefficient matrixes of the NAM network are low-order off-diagonal matrixes, so that the calculation burden occurred when the traditional node analysis method is used for solving large-scale network equations is avoided. The total calculation amount of the method of the present invention is smaller than that of the traditional node analysis method and is linearly proportional to the simulation scale, and the real-time simulation efficiency is improved.

(3) On Kintex-7 410T FPGA chip from XILINX, real-time simulation is carried out on a microgrid consisting of 3 three-phase inverters, 3 Boost circuits and 21 three-phase lines using both the method of the present invention and the traditional node analysis method. According to the method of the present invention, the simulation time-step of 380 ns can be adopted at the minimum, and hardware resources of the FPGA are consumed as follows: look-up table 49.6%, flip-flop 48.8%, RAM block 12.2%, DSP48 multiplier 63.1%. In the traditional node analysis method, the simulation time-step of 1970 ns can be adopted at the minimum, and various hardware resources of the FPGA are consumed as follows: look-up table 81.8%, flip-flop 76.7%, RAM block 12.2%, DSP48 multiplier will exceed 100% and the microgrid real-time simulation cannot be completed. Therefore, the method of the present invention can realize smaller simulation time-step and larger simulation scale on the FPGA, so that the microgrid real-time simulation capability based on the FPGA is improved, and the method of the present invention is very suitable for submicrosecond real-time simulation of the microgrid containing a plurality of power electronic converters and a large number of power distribution lines.

DETAILED DESCRIPTION OF THE INVENTION

The present invention is further explained below with reference to the figures and embodiments.

Figure 3:
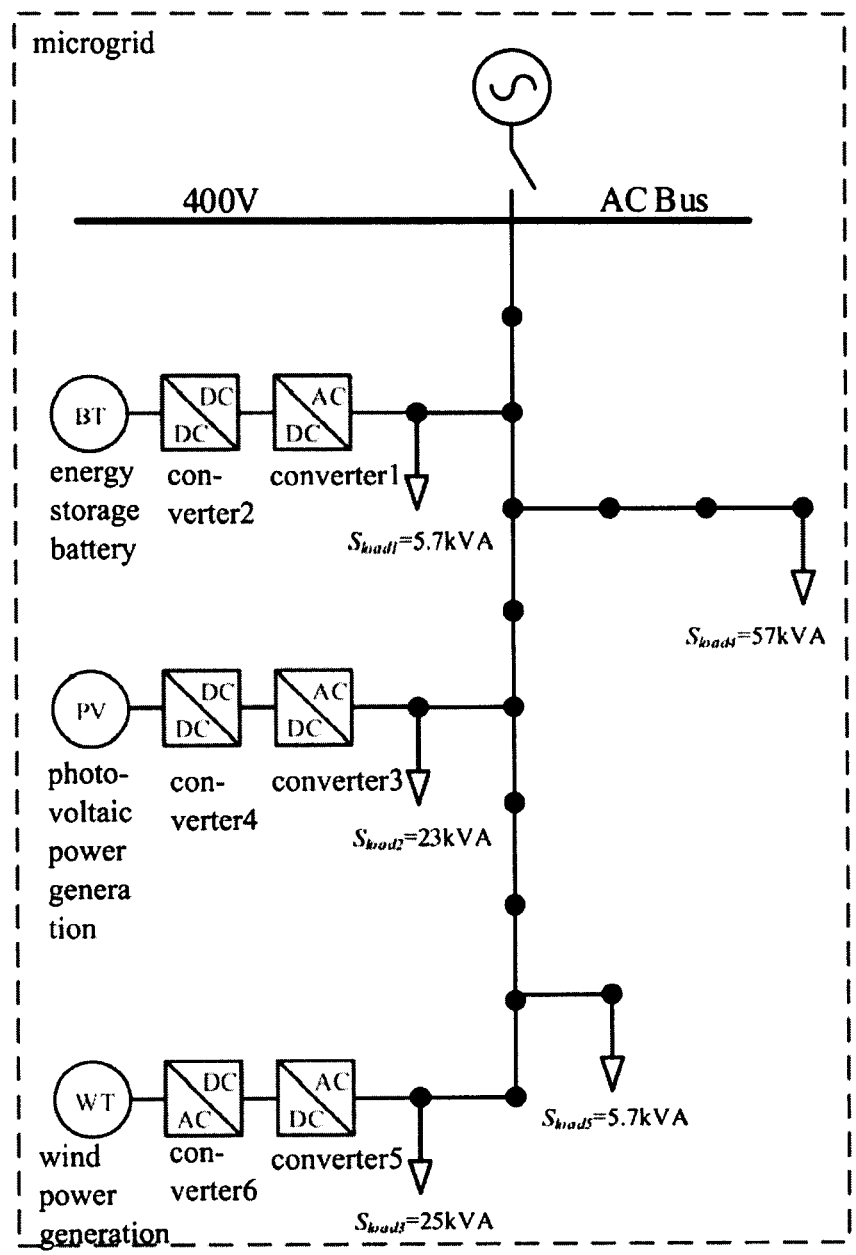
FIG. 3 shows the structure of the microgrid in the present invention.
Figure 4:
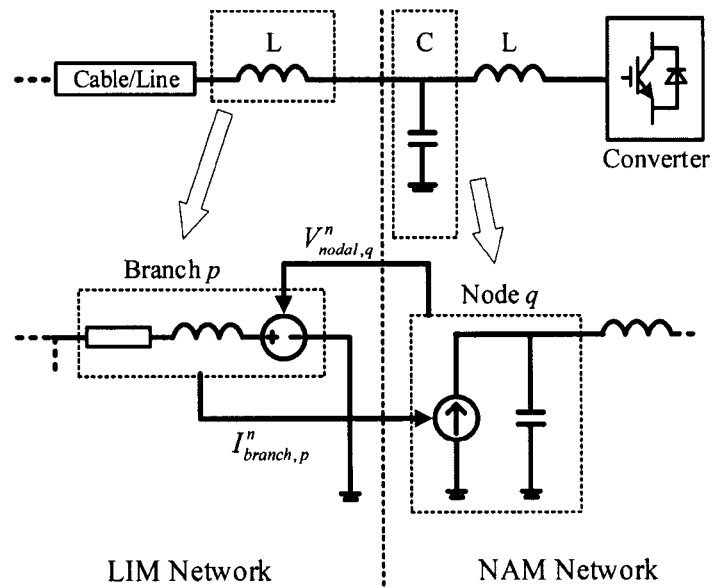
FIG. 4 shows the network decoupling in the method of the present invention.
Figure 5:
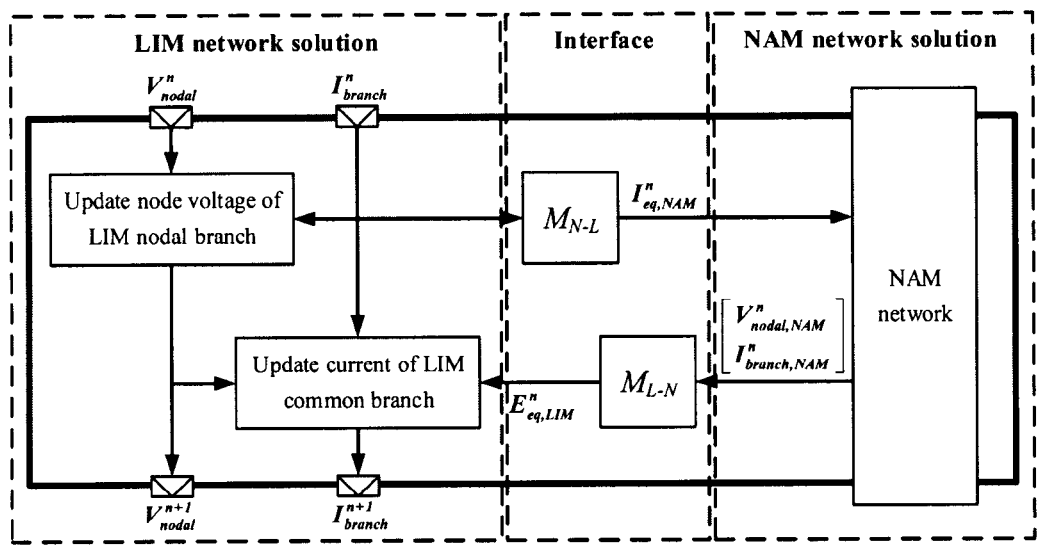
FIG. 5 shows the simulation cycle of the method of the present invention.

As shown in FIG. 3, a microgrid comprising 3 three-phase inverters, 3 circuits, and 21 three-phase lines is taken as an example to illustrate the present invention, but the protection scope of the present invention should not be limited thereby.

When the hybrid electromagnetic transient simulation method suitable for microgrid real-time simulation is applied to real-time simulation of the microgrid, the hardware part mainly comprises: (1) PXIe controller (product model: PXIe-8135) from National Instruments (NI): being mainly responsible for the simulation of a microgrid control system, being able to communicate with a host computer through an Ethernet, and displaying real-time simulation waveforms on the upper computer; and (2) FPGA module (model: PXIe-7975R, built in a Kintex-7 410T FPGA chip from XILINX) from National Instruments (NI): being mainly responsible for the simulation of the circuit part of the microgrid, and being able to be connected with an external controller and an oscilloscope through an I/O port to carry out hardware-in-loop simulation. They communicate with each other through PXIe bus to complete real-time simulation.

Figure 6:
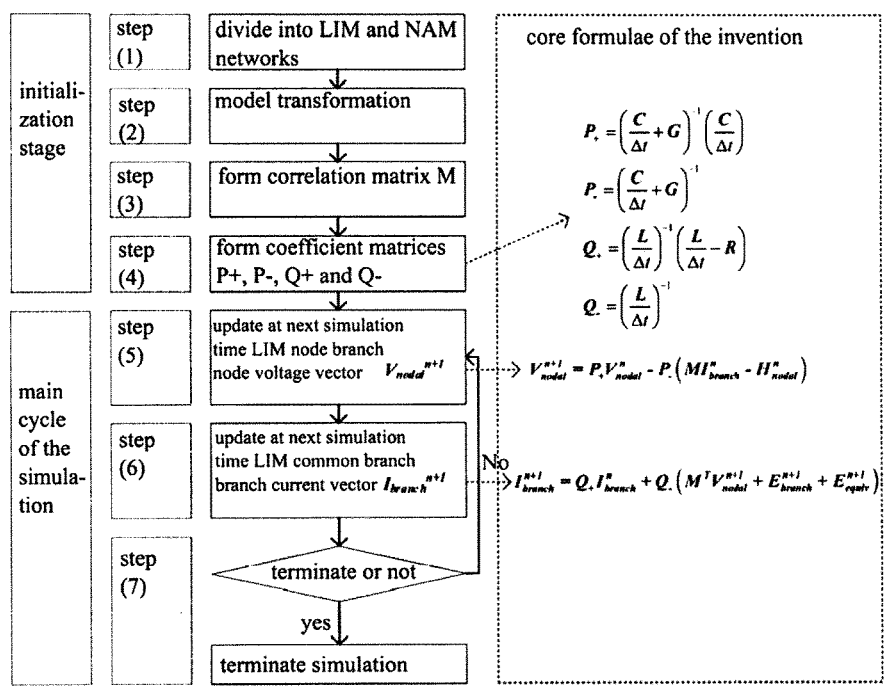
FIG. 6 is a flowchart of the hybrid electromagnetic transient simulation method suitable for microgrid real-time simulation in the present invention.

The software part is mainly Labview development environment from the National Instruments Col, Ltd. (NI). The programs in the upper computer, PXIe controller and FPGA module are programmed with Labview. The programs in the upper computer complete the functions of communication with the PXIe controller, simulation waveform display and the like. The programs in the PXIe controller complete the functions of the communication with the upper computer, reading and writing data from the FPGA module, simulating the control system of the converter, etc. The above-described programs do not fall within the protection scope of the present invention, and related program examples are provided on the official website of the National Instruments (NI) and is not described in details here. In addition, the FPGA module is a specific implementation carrier of the present invention, mainly accomplishes the functions of microgrid simulation calculation and the like. More particularly, with reference to FIG. 6, a flow chart of the hybrid electromagnetic transient simulation method suitable for microgrid real-time simulation is shown.

In the embodiment of the present invention, the hybrid electromagnetic transient simulation method suitable for microgrid real-time simulation of the present invention comprises the following steps:

Step (1) dividing a microgrid model from an LC filter or an LCL filter at an outlet of a converter of a distributed power generation system, wherein inductance L close to a power distribution line of the microgrid in the filter is connected in series with one equivalent voltage source with a grounded negative electrode, and then forms one latency insertion method (LIM) network together with the power distribution line of the microgrid; and capacitance C is connected in parallel with one equivalent current source to ground in a positive direction, forming a node analysis method (NAM) network together with a corresponding distributed power generation system.

Figure 1:
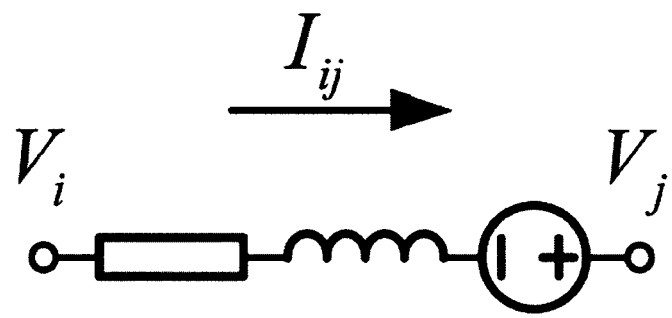
FIG. 1 shows the LIM common branch in the method of the present invention.
Figure 2:
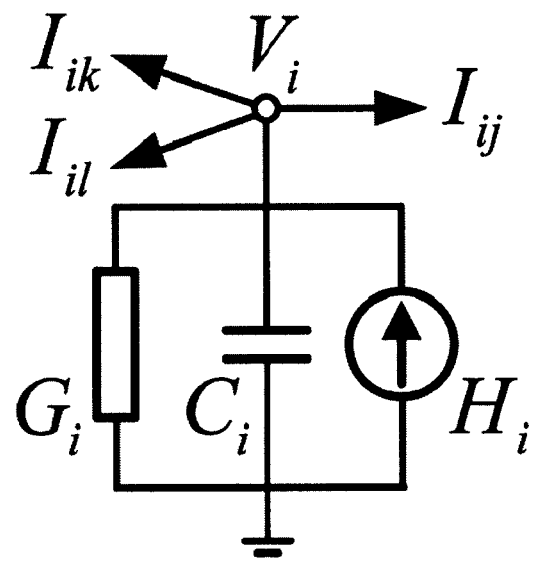
FIG. 2 shows the LIM node branch in the method of the present invention.

Step (2), the power distribution line in the LIM network being represented by a PI equivalent model, namely, a branch between nodes being represented by inductance and resistance in series connection, and a branch from nodes at both ends to ground being represented by capacitance; a voltage source in the LIM network being expressed in a Norton equivalent form, i.e., a form of equivalent conductance in parallel connection with equivalent current source; a load in the LIM network being represented by a constant impedance model, i.e. in a form of resistance, inductance and/or capacitance in parallel connection. Finally, if there are multiple branches between nodes, the branches are converted to one single branch and represented in the form of inductance (necessary), resistance (unnecessary) and a voltage source (unnecessary) in series connection, hereinafter referred to as LIM common branch (as shown in FIG. 1). If there are multiple branches from nodes to ground, the branches are converted to one single branch and represented in the form of capacitance (necessary), conductance (unnecessary) and a current source (unnecessary) in parallel connection, hereinafter referred to as LIM node branch (as shown in FIG. 2). The LIM common branch and LIM node branch are numbered sequentially, respectively.

Step (3) forming a correlation matrix M of the LIM network:

$$M = \begin{bmatrix} 1 & 0 & 0 & 0 & ... & 0 & 0 & 0 & 0 \\ 0 & 1 & 0 & 0 & ... & 0 & 0 & 0 & 0 \\ 0 & 0 & 1 & 0 & ... & 0 & 0 & 0 & 0 \\ -1 & 0 & 0 & 1 & ... & 0 & 0 & 0 & 0 \\ \vdots & \vdots & \vdots & \vdots & \ddots & \vdots & \vdots & \vdots & \vdots \\ 0 & 0 & 0 & 0 & ... & 0 & 0 & 0 & -1 \\ 0 & 0 & 0 & 0 & ... & 0 & 0 & 0 & 0 \\ 0 & 0 & 0 & 0 & ... & 0 & 0 & 0 & 0 \\ 0 & 0 & 0 & 0 & ... & -1 & 0 & 0 & 0 \end{bmatrix}_{54 \times 60}$$

Step (4) forming two node voltage coefficient matrixes $P_+$, $P_-$ and two branch current coefficient matrixes $Q_+$, $Q_-$ of the LIM network:

$$P_+ = \left(\frac{C}{\Delta t} + G\right)^{-1}\left(\frac{C}{\Delta t}\right) \quad P_- = \left(\frac{C}{\Delta t} + G\right)^{-1}$$

$$P_+ = \begin{bmatrix} 1 & 0 & 0 & \cdots & 0 & 0 & 0 \\ 0 & 1 & 0 & \cdots & 0 & 0 & 0 \\ 0 & 0 & 1 & \cdots & 0 & 0 & 0 \\ \vdots & \vdots & \vdots & \ddots & \vdots & \vdots & \vdots \\ 0 & 0 & 0 & \cdots & 0.6622 & 0 & 0 \\ 0 & 0 & 0 & \cdots & 0 & 0.6622 & 0 \\ 0 & 0 & 0 & \cdots & 0 & 0 & 0.6622 \end{bmatrix}_{54 \times 54}$$

$$P_- = \begin{bmatrix} 14.2587 & 0 & 0 & \cdots & 0 & 0 & 0 \\ 0 & 14.2587 & 0 & \cdots & 0 & 0 & 0 \\ 0 & 0 & 14.2587 & \cdots & 0 & 0 & 0 \\ \vdots & \vdots & \vdots & \ddots & \vdots & \vdots & \vdots \\ 0 & 0 & 0 & \cdots & 9.4595 & 0 & 0 \\ 0 & 0 & 0 & \cdots & 0 & 9.4595 & 0 \\ 0 & 0 & 0 & \cdots & 0 & 0 & 9.4595 \end{bmatrix}_{54 \times 54}$$

$$Q_+ = \left(\frac{L}{\Delta t}\right)^{-1}\left(\frac{L}{\Delta t} - R\right) \quad Q_- = \left(\frac{L}{\Delta t}\right)^{-1}$$

$$Q_+ = \begin{bmatrix} 0.9994 & 0 & 0 & \cdots & 0 & 0 & 0 \\ 0 & 0.9994 & 0 & \cdots & 0 & 0 & 0 \\ 0 & 0 & 0.9994 & \cdots & 0 & 0 & 0 \\ \vdots & \vdots & \vdots & \ddots & \vdots & \vdots & \vdots \\ 0 & 0 & 0 & \cdots & 1 & 0 & 0 \\ 0 & 0 & 0 & \cdots & 0 & 1 & 0 \\ 0 & 0 & 0 & \cdots & 0 & 0 & 1 \end{bmatrix}_{60 \times 60}$$

$$Q_- = \begin{bmatrix} 0.0130 & 0 & 0 & \cdots & 0 & 0 & 0 \\ 0 & 0.0130 & 0 & \cdots & 0 & 0 & 0 \\ 0 & 0 & 0.0130 & \cdots & 0 & 0 & 0 \\ \vdots & \vdots & \vdots & \ddots & \vdots & \vdots & \vdots \\ 0 & 0 & 0 & \cdots & 6.6667 \times 10^{-4} & 0 & 0 \\ 0 & 0 & 0 & \cdots & 0 & 6.6667 \times 10^{-4} & 0 \\ 0 & 0 & 0 & \cdots & 0 & 0 & 6.6667 \times 10^{-4} \end{bmatrix}_{60 \times 60}$$

C and G being diagonal matrixes of $N_n \times N_n$, and diagonal elements being ground capacitance and ground conductance of a LIM node branch with a corresponding number; L and R being diagonal matrixes of $N_b \times N_b$, and diagonal elements being inductance and capacitance of a LIM common branch with a corresponding number; $\Delta t$ being a simulated time-step; $N_n$ and $N_b$ being a number of LIM node branch(es) and a number of LIM common branch(es) respectively; the above-mentioned content is the initialization process of the simulation, and the main cycle procedure of the simulation is entered below.

Step (5) updating a node voltage of the LIM node branch:

$$V_{nodal}^{n+1} = P_{30} V_{nodal}^n - P_-(MI_{branch}^n - H_{nodal}^n)$$

$$V_{nodal}^n = [-7.3687 \times 10^{-7}\ -7.3687 \times 10^{-7} \ldots -2.1780 \times 10^{-7}\ 4.3560 \times 10^{-7}]_{54 \times 1}^T$$

$$I_{branch}^n = [8.6629 \times 10^{-8}\ 8.6629 \times 10^{-8} \ldots -8.6077 \times 10^{-6}\ 1.7215 \times 10^{-5}]_{60 \times 1}^T$$

$$H_{nodal}^n = [0\ 0\ \ldots\ 0\ 0]_{54 \times 1}^T$$

$$V_{nodal}^{n+1} = [-1.9744 \times 10^{-6}\ -1.9744 \times 10^{-6} \ldots -5.5864 \times 10^{-7}\ 1.1173 \times 10^{-6}]_{54 \times 1}^T$$

$V_{nodal}^{n+1}$ being a node voltage vector of the LIM node branch at time n+1, $I_{branch}^n$ being a branch current vector of the LIM common branch at time n, and $H_{nodal}^n$ being an equivalent current source vector of the LIM node branch at time n; at the same time, the simulation solution of NAM network is carried out.

Step (6) updating a branch current of the LIM common branch:

$$I_{branch}^{n+1} = Q_+ I_{branch}^n + Q_-(M^T V_{nodal}^{n+1} + E_{branch}^{n+1} + E_{equiv}^{n+1})$$

$$E_{branch}^{n+1} = [0\ 0\ \ldots\ 0\ 0]_{60 \times 1}^T$$

$$E_{equiv}^{n+1} = [0\ 0\ \ldots\ -0.0056\ 0.0112]_{60 \times 1}^T$$

$$I_{branch}^{n+1} = [1.8467 \times 10^{-7}\ 1.8467 \times 10^{-7} \ldots -1.2310 \times 10^{-5}\ 2.4620 \times 10^{-5}]_{60 \times 1}^T$$

$M^T$ being a transposition operation of correlation matrix M, $E_{equiv}^{n+1}$ being an equivalent voltage source vector of the LIM common branch at time n+1, which is a non-zero element only at a position corresponding to a filter inductance branch and has a magnitude of a voltage magnitude corresponding to a filter capacitance in the NAM network; an obtained current in the filter inductance branch in $I_{branch}^n$ serving as a corresponding parallel equivalent current source of a filter capacitance branch in next NAM network simulation solution.

Step (7) returning to the step 5, and entering the next simulation cycle.

$$V_{nodal}^{n+1} = -[-1.9744 \times 10^{-6}\ -1.9744 \times 10^{-6} \ldots -5.5864 \times 10^{-7}\ 1.1173 \times 10^{-6}]_{54 \times 1}^T$$

$$I_{branch}^{n+1} = [1.8467 \times 10^{-7}\ 1.8467 \times 10^{-7} \ldots -1.2310 \times 10^{-5}\ 2.4620 \times 10^{-5}]_{60 \times 1}^T$$

$$H_{nodal}^{n+1} = [0\ 0\ \ldots\ 0\ 0]_{54 \times 1}^T$$

$V_{nodal}^{n+2} = [-4.6126 \times 10^{-6} \ -4.6126 \times 10^{-6} \ \ldots \ -1.2551 \times 10^{-6} \ 2.5101 \times 10^{-6}]_{54 \times 1}^T$ $E_{branch}^{n+2} = [0 \ 0 \ \ldots \ 0 \ 0]_{60 \times 1}^T$ $E_{equiv}^{n+2} = [0 \ 0 \ \ldots \ -0.0072 \ 0.0144]_{60 \times 1}^T$ $I_{branch}^{n+2} = [3.5258 \times 10^{-7} \ 3.5258 \times 10^{-7} \ \ldots \ -1.7057 \times 10^{-5} \ 3.4114 \times 10^{-5}]_{60 \times 1}^T$ The steps (5)-(7) are thus cycled through. The simulation is terminated until a specified simulation time or when an instruction for terminating in advance is received.

The experimental results show that real-time simulation is carried out on one microgrid composed of 3 three-phase inverters, 3 Boost circuits and 21 three-phase lines by using both the present method and the traditional node analysis method on a Kintex-7 410T FPGA chip from XILINX. According to the method of the present invention, the simulation time-step of 380 ns can be adopted at the minimum, and various hardware resources of the FPGA are consumed as follows: look-up table 49.6%, flip-flop 48.8%, RAM block 12.2%, DSP48 multiplier 63.1%. In the traditional method, the simulation time-step of 1970 ns can be adopted at the minimum, and various hardware resources of the FPGA are consumed as follows: look-up table 81.8%, flip-flop 76.7%, RAM block 12.2%, DSP48 multiplier will exceed 100% and the microgrid real-time simulation cannot be completed. Therefore, the method of the present invention can realize smaller simulation time-step and larger simulation scale on the FPGA, so that the microgrid real-time simulation capability based on the FPGA is improved, and the method is very suitable for submicrosecond-level real-time simulation of the microgrid containing a plurality of power electronic converters and a large number of power distribution lines.

The present invention provides a hybrid electromagnetic transient simulation method suitable for microgrid real-time simulation, characterized in that a traditional node analysis method (NAM) and a highly parallel latency insertion method (LIM) are combined, so that the microgrid is firstly divided from a filter of a distributed power generation system to form one latency insertion method (LIM) network containing a power distribution line and a plurality of node analysis method (NAM) networks containing the distributed power generation system respectively, the NAM network being simulated by traditional node analysis method, the LIM network being simulated by the latency insertion method, in an initialization stage, one correlation matrix and four diagonal matrixes containing line parameters used for LIM network simulation being formed according to line topology and parameters of the microgrid, in a main cycle of the simulation, the LIM network being able to be solved simultaneously with multiple NAM networks, a parallelism of a microgrid simulation being improved, in addition, a diagonal matrix multiplication being mainly used to carry out calculation in a solution process of the LIM network simulation, a computational burden of solving large-scale network equations by the node analysis method being avoided, and a simulation efficiency being improved.

We claim:

1. A hybrid electromagnetic transient simulation method for microgrid real-time simulation, comprising an initialization stage of steps (1) to (4) and a simulation cycle stage of steps (5) to (7):
    (1) performing division of network by dividing a microgrid model from a filter at an outlet of a converter of a distributed power generation system, connecting in series an inductance L in the filter to an equivalent voltage source, wherein the inductance L is close to a power distribution line of the microgrid, and the equivalent voltage source comprises a grounded negative electrode, and forming a latency insertion method network with the power distribution line of the microgrid,
    connecting remaining capacitance of each filter to an equivalent current source in parallel, of which a positive direction is flowing into the ground, and forming a node analysis method network with a corresponding distributed power generation system;
    (2) performing model exchange by representing the power distribution line in a latency insertion method network by an equivalent $\pi$ model, wherein a branch between nodes is represented by inductance and resistance in series connection, and a branch from nodes at both ends to ground is represented by capacitance,
    representing a voltage source in the latency insertion method network by Norton equivalent form, wherein an equivalent conductance is in parallel connection with an quivalent current source,
    representing a load in the latency insertion method network by a constant impedance model, wherein resistance, inductance, capacitance, or a combination thereof are in parallel connection,
    if there are multiple branches between nodes, converting the multiple branches into one single branch and expressing in a form of inductance, resistance, the voltage source, or a combination thereof in series connection to form a common branch in the latency insertion method network,
    if there are multiple branches from the node to ground, converting the multiple branches into one single branch and expressing in a form of capacitance, conductance, a current source, or a combination thereof in parallel connection to form a node branch in the latency insertion method network,
    sequentially numbering the common branch and the node branch in the latency insertion method network, respectively, starting with a number of a grounded node being 0;
    (3) forming a correlation matrix M of the latency insertion method network according to following rules:
    (i) if common branch p is connected with node branch q, and a positive direction defined by common branch p is flowing out of node branch q, M(q,p)=1;
    (ii) if common branch p is connected with node branch q and a positive current direction defined by common branch p is flowing into node branch q, M(q,p)=−1;
    (iii) if common branch p and node branch q are not connected, M(q,p)=0;
    (4) forming two node voltage coefficient matrixes P+, P− and two branch current coefficient matrixes Q+, Q− of the LIM network according to following rules:

$$P_+ = \left(\frac{C}{\Delta t} + G\right)^{-1}\left(\frac{C}{\Delta t}\right) \quad P_- = \left(\frac{C}{\Delta t} + G\right)^{-1}$$

$$Q_+ = \left(\frac{L}{\Delta t}\right)^{-1}\left(\frac{L}{\Delta t} - R\right) \quad Q_- = \left(\frac{L}{\Delta t}\right)^{-1}$$

C and G being diagonal matrixes of $N_n \times N_n$, and diagonal elements being ground capacitance and ground conductance of the node branch in the latency insertion method network with a corresponding number; L and R being diagonal matrixes of $N_b \times N_b$, and diagonal elements being inductance and capacitance of the common branch in the latency insertion method network with a corresponding number;

$\Delta t$ being a simulated time-step; $N_n$ and $N_b$ being a number of the node branch(es) in the latency insertion method network and a number of the common branch(es) in the latency insertion method network, respectively;

(5) updating a node voltage of the node branch in the latency insertion method network according to following rule:

$$V_{nodal}^{n+1} = P_+ V_{nodal}^n - P_- (M I_{branch}^n - H_{nodal}^n)$$

$V_{nodal}^{n+1}$ being a node voltage vector of the node branch in the latency insertion method network at time n+1, $I_{branch}^n$ being a branch current vector of the common branch in the latency insertion method network at time n, and $H_{nodal}^n$ being an equivalent current source vector of the node branch in the latency insertion method network at time n;

carrying out simulation solution of the node analysis method network simultaneously;

(6) updating a branch current of the common branch in the latency insertion method network according to following rule to serve as a corresponding parallel equivalent current source of a filter capacitance branch in next node analysis method network simulation solution;

$$I_{branch}^{n+1} = Q_+ I_{branch}^n + Q_- (M^T V_{nodal}^{n+1} + E_{branch}^{n+1} + E_{equiv}^{n+1})$$

$M^T$ being a transposition operation of correlation matrix M, $E_{equiv}^{n+1}$ being an equivalent voltage source vector of the common branch in the latency insertion method network at time n+1, which is a non-zero element only at a position corresponding to a filter inductance branch and has a magnitude of a voltage magnitude corresponding to a filter capacitance in the node analysis method network; and (7) judging whether simulation is terminated or not, if not, returning to step (5), entering a next simulation cycle, and terminating the simulation until a specified simulation time or when an instruction for terminating in advance is received.

2. The hybrid electromagnetic transient simulation method of claim 1, wherein the filter is an LC filter or an LCL filter.

* * * * *